(12) United States Patent
Graves et al.

(10) Patent No.: US 7,091,264 B2
(45) Date of Patent: Aug. 15, 2006

(54) RUBBER COMPOSITION FOR PREPARING GOLF BALL COMPONENTS

(75) Inventors: Daniel F Graves, Canal Fulton, OH (US); Mitch Barry, North Canton, OH (US)

(73) Assignee: Firestone Polymers, LLC, Akron, OH (US)

( * ) Notice: Subject to any disclaimer, the term of this patent is extended or adjusted under 35 U.S.C. 154(b) by 382 days.

(21) Appl. No.: 10/423,385

(22) Filed: Apr. 25, 2003

(65) Prior Publication Data

US 2003/0216193 A1 Nov. 20, 2003

Related U.S. Application Data

(60) Provisional application No. 60/375,980, filed on Apr. 25, 2002.

(51) Int. Cl.
*A63B 37/06* (2006.01)
*C08K 5/098* (2006.01)

(52) U.S. Cl. ............... 523/351; 524/51; 524/58; 524/394; 524/397; 524/399; 525/274; 473/371; 473/372

(58) Field of Classification Search ......... 523/351; 524/51, 58, 394, 397, 399; 525/274; 473/371, 473/372
See application file for complete search history.

(56) References Cited

U.S. PATENT DOCUMENTS

| | | | |
|---|---|---|---|
| 4,305,851 A | 12/1981 | Tominaga et al. | 260/5 |
| 4,561,657 A | 12/1985 | Tominaga et al. | 273/218 |
| 4,838,556 A * | 6/1989 | Sullivan | 473/372 |
| 5,018,740 A * | 5/1991 | Sullivan | 473/372 |
| 5,508,350 A * | 4/1996 | Cadorniga et al. | 525/193 |
| 5,697,856 A | 12/1997 | Moriyama et al. | 473/374 |
| 5,919,862 A | 7/1999 | Rajagopalan | 525/63 |
| 5,971,869 A | 10/1999 | Rajagopalan et al. | 473/371 |
| 5,981,658 A | 11/1999 | Rajagopalan et al. | 525/72 |
| 5,998,506 A | 12/1999 | Nesbitt | 523/219 |
| 6,004,226 A | 12/1999 | Asakura | 473/373 |
| 6,071,201 A | 6/2000 | Maruko | 473/373 |
| 6,334,820 B1 | 1/2002 | Sasaki | 473/374 |
| 6,394,915 B1 * | 5/2002 | Nesbitt | 473/378 |
| 2001/0034412 A1 | 10/2001 | Nesbitt | 525/193 |
| 2003/0207999 A1 * | 11/2003 | Higuchi et al. | 525/274 |

FOREIGN PATENT DOCUMENTS

| | | | |
|---|---|---|---|
| JP | 02092379 | * | 4/1990 |
| WO | WO 92/07631 | | 5/1992 |

* cited by examiner

*Primary Examiner*—David J. Buttner
(74) *Attorney, Agent, or Firm*—Arthur M. Reginelli (57) ABSTRACT

A method for improving the feel and rebound velocity of a golf ball, the method comprising preparing a golf ball from a rubber composition that comprises a rubber, from about 3 to about 12 parts by weight of a processing additive per 100 parts by weight rubber, from about 18 to about 32 parts by weight of a multi-functional crosslinking agent per 100 parts by weight rubber, from about 0.2 to about 1.0 parts by weight of a cure initiator per 100 parts by weight rubber, from about 0 to about 25 parts by weight zinc oxide per 100 parts by weight rubber, and from about 0 to about 0.7 parts by weight antioxidant

11 Claims, 8 Drawing Sheets

RUBBER COMPOSITION FOR PREPARING GOLF BALL COMPONENTS

This application claims the benefit of U.S. Provisional Application No. 60/375,980, filed on Apr. 25, 2002.

FIELD OF THE INVENTION

This invention relates to rubber compositions that are useful for making golf ball components as well as the golf ball components and golf balls prepared therefrom.

BACKGROUND OF THE INVENTION

In the art of making golf balls, it is desirable to achieve a cured rubber component that has a soft feel with maximum rebound. In particular, these properties are highly desirable at high frequencies, which can be observed by analyzing the viscoelastic properties of the cured components. For example, the elastic storage modulus, i.e., G', is indicative of the rubber components hardness and is therefore preferably minimized, especially at higher frequencies. The hysteresis loss of the rubber component, i.e., tan δ, which is G"/G', is indicative of the rebound characteristics of the rubber component. In other words, as the loss of energy due to heat is minimized, the available energy that can be returned as rebound is maximized.

Inasmuch as these desirable properties are inversely related to one another, there is a continued need to develop rubber compositions that give rise to cured components that demonstrate both low modulus and low hysteresis loss at higher frequencies.

SUMMARY OF THE INVENTION

A rubber composition useful for preparing golf ball cores comprising a rubber, a processing additive, a multi-functional crosslinking agent, a cure initiator, zinc oxide, and optionally an antioxidant. This invention also provides novel methods for making these compositions as well as the golf balls and cores made therefrom.

DETAILED DESCRIPTION OF ILLUSTRATIVE EMBODIMENTS

The golf ball components of this invention are prepared from rubber compositions that include a dispersing agent. In one embodiment, the dispersing agent is added to a rubber cement and isolated from the cement with the rubber.

In general, the rubber compositions employed in practicing the present invention are similar to those conventionally employed in the art except for the addition of the dispersing agent. In one embodiment, this rubber composition will include a rubber, the dispersing agent, a multi-functional crosslinking agent, a cure initiator, and optional ingredients such as zinc oxide and antioxidants.

Although the practice of this invention is not limited to the selection of any particular rubber, it is preferred that the rubber include a high-cis polybutadiene polymer. High-cis refers to the fact that at least 60%, more preferably at least 70%, and even more preferably at least 80% of the butadiene monomeric units of the polymer are in the cis configuration.

The high-cis polybutadiene preferably has a high molecular weight, which can be characterized by having a Mooney Viscosity ($ML_{1+4}$@100° C.) that is at least 40, more preferably at least 45, and even more preferably at least 50. In a preferred embodiment, the Mooney Viscosity ($ML_{1+4}$@100° C.) is less than 60.

Although numerous methods are known in the art for preparing high-cis polybutadiene, the preferred method includes the use of a nickel-based catalyst that includes triisobutylaluminum, a fluoride ion such as boron trifluoride, and nickel boroacylate. These catalysts are known in the art as disclosed in U.S. Pat. Nos. 4,562,171 and 4,562,172.

The dispersing agents, which may also be referred to as processing additives, include those compounds, or mixtures thereof, that aid in dispersing the other ingredients within the rubber composition. Useful processing additives include polar organic compounds, resins, and low-molecular weight polymers. Petroleum-derived oils, such as paraffinic, aromatic, and naphthenic oils, are preferably excluded. Those compounds having a flash-point that is less than about 125° C. are preferably excluded. In one embodiment, the preferred dispersing agents have a flash-point in excess of 125° C.

The polar organic compounds preferably include high-HLB surfactants, esters, ketones, aldehydes, ethers, amides, amines, carboxylic acids, fatty acids, sulfonic acids, organic sulfates, metal carboxylates, metal sulfonates, or mixtures thereof.

The preferred high-HLB surfactants include those compounds that have a hydrophilic-lipophilic balance (HLB) from about 3 to about 35, more preferably from about 10 to about 33, and even more preferably from about 20 to about 30. Higher HLB values correspond to greater hydrophilicity. These surfactants may be liquid or solid at room temperature. The molecular weight of these surfactants is preferably from about 100 g/mole to about 15,000 g/mole, more preferably from about 1,000 g/mole to about 14,000 g/mole, and more preferably from about 5,000 g/mole to about 13,000 g/mole.

Useful high-HLB surfactants include fatty acid esters of hydrogenated and non-hydrogenated $C_5$ and $C_6$ sugars e.g., sorbitose, mannitose and arabinose. These compounds have at least three hydroxyl groups and from one to 3.5 ester groups (sesqui esters). Also useful are the polyoxyethylene derivatives thereof. The esterified hydrogenated and non-hydrogenated sugars can be described generally by the following formula using sorbitol as the representative ester where R is derived from $C_{10}$ to $C_{22}$ saturated and unsaturated fatty acids, for example, stearic, lauric, palmitic, oleic and the like.

Representative examples include the sorbitan oleates, including monooleate, dioleate, trioleate and sesquioleate, as well as sorbitan esters of laurate, palmate and stearate fatty acids, and polyoxyethylene derivatives thereof, and other polyols and, more particularly, glycols, such as polyhydroxy compounds, and the like. In similar fashion, other esters can be formed with mannitose and arabinose.

Useful high-HLB surfactants are commercially available under the tradenames Tween 20, Span 20, SPAN 60 (sorbitan stearate); SPAN 80 (sorbitan oleate) and SPAN 85 (sorbitan tri-oleate), and Myrj 59 (ICI Surfactants; Wilmington, Del.), and the tradenames Pluronic L35, Pluronic F38, and Pluronic F88 (BASF; Mount Olive, N.J.). Other commercially available sorbitans include the sorbitan monooleates known as Alkamuls SMO; Capmul O; Glycomul O; Arlacel 80; Emsorb 2500 and, S-Maz 80.

The polyoxyethylene derivatives of the foregoing processing aids may also be employed. These include fatty acid esters of hydrogenated and non-hydrogenated $C_5$ and $C_6$ sugars e.g., sorbitose, mannitose and arabinose, and have at least three hydroxyl groups and from one to 3.5 ester groups (sesqui esters). The polyoxyethylene derived esterified hydrogenated and non-hydrogenated sugars can be described generally by the following formula again, using sorbitol as the representative ester where R is derived from $C_{10}$ to $C_{22}$ saturated and unsaturated fatty acids, for example, stearic, lauric, palmitic, oleic and the like and the sum of w+x+y+z equals 20.

The polyoxyethylene derivatives of these processing aids, sometimes referred to as polysorbates and polyoxyethylene sorbitan esters, are analogous to the fatty acid esters of hydrogenated and non-hydrogenated sugars noted above (sorbitans) except that ethylene oxide units are placed on each of the hydroxyl groups. Commercially available polysorbates include POE (20) sorbitan monooleate; Polysorbate 80; Tween 80; Emsorb 6900; Liposorb O-20; T-Maz 80. Other useful products include TWEEN 60 [POE (20) sorbitan stearate]; TWEEN 80 [POE (20) sorbitan oleate]; TWEEN 85 [POE (20) sorbitan tri-oleate]; POE (20) sorbitan sesquioleate; POE (20) sorbitan laurate; POE (20) sorbitan palmate as well as TWEEN 20, TWEEN 21, TWEEN 60K, TWEEN 65, TWEEN 65K and TWEEN 81 (ICI Specialty Chemicals).

The carboxylic acids, which may be saturated or unsaturated, preferably include those containing from 2 to about 30 carbon atoms, more preferably about 5 to about 24 carbon atoms, and even more preferably about 8 to about 18 carbon atoms. Preferred acids include fatty acids, which are those carboxylic acids that are obtained from natural sources. Useful acids include stearic acid, lauric acid, palmitic acid, oleic acid, myristic acid, and linoleic acid.

The sulfonic acids include those compounds that include one or more sulfonic acid groups ($SO_2OH$) that are attached to a carbon atom of a hydrocarbyl group. Exemplary types of sulfonic acids include alkylsulfonic acids, alkylbenzenesulfonic acids, and alkylnaphthalenesulfonic acids. Useful sulfonic acids include octylsulfonic acid, dodecylbenzenesulfonic acid, and dodecylnaphthenesulfonic acid.

The carboxylates, which may also be referred to as organic salts, preferably include alkali metals such as sodium and potassium, alkaline-earth metals such as magnesium and calcium, or transition metals such as iron, nickel, and zinc. The hydrocarbon portion of these carboxylates preferably derives from carboxylic acids, which may be saturated or unsaturated, that include from about 4 to about 40 carbon atoms, more preferably from about 6 to about 30 carbon atoms, and most preferably from about 8 to about 24 carbon atoms. These hydrocarbons are preferably aliphatic, and even more preferably saturated. In one embodiment, the hydrocarbon derives from a fatty acid, examples of which are described above. Examples of organic salts include sodium stearate, sodium myristate, sodium laurate, sodium palmitate, sodium oleate, sodium linoleate, calcium stearate, calcium myristate, calcium laurate, calcium palmitate, calcium oleate, sodium myristate, zinc stearate, zinc myristate, zinc laurate, zinc palmitate, zinc oleate, and zinc linoleate. Useful organic salts are commercially available under the tradename AKROCHEM PROAID 9810 (Akrochem; Akron, Ohio), NORAC Calcium Stearate (Sovereign Chemical Co.; Akron, Ohio), COAD 10, 20, 23, LM, which are calcium stearate, zinc stearate, zinc stearate, and calcium stearate salts, respectively (Sovereign Chemical Co.), MAXIFLOW RS and SP (Rubber Service; Argentina), STRUKTOL A50, A91F, and EF44A, which are zinc soaps of various fatty acids (Struktol; Stow, Ohio). Blends of fatty acids together with esters are also commercially available under the tradename STRUKTOL WA48 and WB16 (Struktol).

In a preferred embodiment, blends of zinc carboxylates are employed. These blends may include mixtures of carboxylates that are distinguished based upon the configuration of the hydrocarbon or the size of the hydrocarbon. These blends preferably include mixtures of various zinc fatty acid salts. The fatty acids from which the salts may be prepared include both saturated and unsaturated fatty acids. The saturated fatty acids may include butyric acid, lauric acid, palmitic acid, and stearic acid. The unsaturated fatty acids may include oleic and linoleic acid. Commercial blends of stearic acids may also be employed, which include about 45% palmitic acid, about 50% stearic acid, and about 5% oleic acid. Useful blends of zinc carboxylates are commercially available under the tradename Aktiplast GT (Rhein Chemie Corp; Trenton, N.J.), which are zinc fatty acid salts.

The metal sulfonates preferably include alkali metals such as sodium and potassium, alkaline-earth metals such as magnesium and calcium, or transition metals such as iron, nickel, and zinc. The hydrocarbon portion of these carboxylates preferably derives from sulfonic acids that include from about 4 to about 40 carbon atoms, more preferably from about 6 to about 30 carbon atoms, and most preferably from about 8 to about 24 carbon atoms. These hydrocarbons are preferably aliphatic, and even more preferably saturated. Useful types of metal sulfonates include sodium, calcium or zinc alkyl sulfonate, alkylbenzenesulfonate, and alkylnaphthalene sulfonate.

Organic sulfates are metal salts of the reaction product of sulfuric acid and an alcohol. Alkali metals, alkaline-earth metals, and transition metals may be employed to form the salt. The alcohol preferably includes from about 2 to 30 carbon atoms and more preferably from about 6 to about 20 carbon atoms.

The multi-functional crosslinking agents employed in preparing the rubber compositions of this invention preferably include ionic crosslinking agents. Preferred examples of ionic multi-functional crosslinking agents include zinc diacrylate and zinc dimethacrylate.

Useful cure initiators include those compounds that will promote, initiate, or catalyze a reaction between the multifunctional crosslinking agent and the rubber and thereby crosslink or cure the rubber. Those skilled in the art will be able to select appropriate cure initiators based upon selection of the multi-functional crosslinking agent. In one embodiment, where zinc diacrylate is employed as the multi-functional crosslinking agent, useful cure initiators include peroxide compounds such as dicumyl peroxide or bisperoxide compounds. Dicumyl peroxide compounds are commercially available under the tradename Di-Cup™ and bisperoxide compounds are available under the tradename Vul-Cup™ (Hercules, Inc.; Wilmington, Del.).

The rubber compositions employed in the present invention may also include various ingredients that are employed in preparing conventional rubber compositions. These optional ingredients include zinc oxide and various antioxidants. Useful antioxidants include hinder phenols.

In preparing the rubber compositions employed in the practice of the present invention, the addition of the processing additive does not necessarily alter the amount of other ingredients that are conventionally employed.

In one embodiment, the rubber compositions will include from about 3 to about 12 parts by weight processing additive per 100 parts by weight rubber (phr), from about 18 to about 32 parts by weight multi-functional crosslinking agent phr, from about 0.2 to about 1.0 parts by weight cure initiator phr, from about 0 to about 25 parts by weight zinc oxide phr, and from about 0 to about 0.7 parts by weight antioxidant phr. In a preferred embodiment, the rubber composition will include from about 5 to about 10 parts by weight processing additive per 100 parts by weight rubber (phr), from about 20 to about 30 parts by weight multi-functional crosslinking agent phr, from about 0.3 to about 0.7 parts by weight cure initiator phr, from about 2 to about 20 parts by weight zinc oxide phr, and from about 0.1 to about 0.5 parts by weight antioxidant phr.

In another preferred embodiment, the rubber composition will include from about 6 to about 9 parts by weight processing additive per 100 parts by weight rubber (phr), from about 22 to about 28 parts by weight multi-functional crosslinking agent phr, from about 0.4 to about 0.6 parts by weight cure initiator phr, from about 5 to about 15 parts by weight zinc oxide phr, and from about 0.2 to about 0.4 parts by weight antioxidant phr.

The rubber compositions of this invention are prepared by mixing or compounding the ingredients according to conventional rubber compounding or mixing techniques. In a preferred embodiment, a two-step compounding procedure is employed. In this procedure, the ingredients of the rubber composition, except for the cure initiator, are mixed at a high temperature such as 100 to about 150° C. In the second stage of the mixing process, the cure initiator is added and mixing is continued at a lower temperature such as about 100° C.

In one preferred embodiment, the preparation of the rubber composition includes the formation of a premix, which is a masterbatch of the rubber and the processing additive.

The premix is formed by adding at least one processing additive to a rubber polymer cement, which thereby forms a modified polymer cement, and subsequently isolating the rubbery elastomer and processing additive from the solvent. The addition of the processing additive to the cement can occur by employing several techniques. In one embodiment, the processing additive is added directly to the cement. In another embodiment, the processing additive is added to the cement via a cocktail. Once the processing additive is added to the cement to form the modified polymer cement, the modified polymer cement may be mixed or agitated. The polymer and processing additive are then isolated from the solvent and optionally dried to form the premix.

In one embodiment, the cocktail is a blend of an organic solvent and a processing additive. Additional ingredients that may be added to this cocktail include antioxidants and oils, which include plasticizers, extender oils, and synthetic oils. Useful organic solvents are described above. Useful solvents include commercial cyclohexanes, commercial hexanes, or a blend of commercial cyclohexanes and hexanes.

The cocktail preferably includes from about 5 to about 50 parts by weight processing aid and from about 100 to about 35 parts by weight solvent.

The cocktail is prepared by combining and preferably mixing the ingredients. This step of combining preferably occurs at a temperature from about 30 to about 140° C., more preferably from about 40 to about 130° C., and even more preferably from about 50 to about 120° C. Mixing is preferably continued until the processing additive is homogenized within the solvent and optional oil.

The cocktail is preferably added to the polymer cement while the polymer cement is undergoing agitation. Preferably, the polymer cement is at a temperature of about 30 to about 120° C., more preferably from about 40 to about 110° C., and even more preferably from about 50 to about 100° C. The cocktail is also preferably maintained within these temperature ranges during the addition process.

The amount of processing aid added to the polymer cement or latex is generally from about 0.1 to about 20 phr, preferably from about 5.0 to about 15 phr, more preferably from about 6.0 to about 10 phr, still more preferably from about 1.2 to about 8 phr, and still more preferably from about 1.5 to about 5 phr, where phr refers to the parts by weight of ingredient, i.e., processing aid, per 100 parts by weight of rubber.

After formation of the modified polymer cement or latex, the rubbery elastomer and the processing aid are isolated from the solvent and preferably dried. This isolated composition may be referred to as the rubber/processing aid premix or simply premix. Conventional procedures for desolventization and drying may be employed. In one embodiment, where a polymer cement is employed, the premix may be isolated from the solvent by steam distillation of the solvent followed by filtration. Residual solvent may be removed by drying the rubber/processing aid masterbatch by using conventional drying techniques such as a drum dryer. Alternatively, the rubber-modified cement may be directly drum dried to produce the premix.

Once the rubber composition has been compounded or mixed, the composition is extruded and shaped according to conventional procedures for forming golf balls. Upon formation of the uncured or green golf ball component, the uncured ball is subjected to curing conditions. In a preferred embodiment, a two-stage curing process is employed as is conventional in the art. The compositions of this invention are particularly useful for forming the cores of multi-piece golf balls. The overall construction and methods for manufacturing these golf balls are well known in the art as exemplified in U.S. Pat. Nos. 5,697,856, 5,919,862, 5,932,661, 5,971,869, 5,981,658, 5,998,506, 6,004,226, and 6,071,201, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Samples 1–8

Eight rubber compositions were prepared according to the recipe set forth in Table I.

TABLE I

| Sample | 1 | 2 | 3 | 4 | 5 | 6 | 7 | 8 |
|---|---|---|---|---|---|---|---|---|
| Rubber I | 100.0 | 100.0 | — | — | — | — | — | — |
| Rubber II | — | — | 100.0 | 100.0 | — | — | — | — |
| Rubber III | — | — | — | — | 100.0 | 100.0 | — | — |
| Premix I | — | — | — | — | — | — | 110.0 | — |
| Premix II | — | — | — | — | — | — | — | 110.0 |
| Zinc Diacrylate | 23.0 | 23.0 | 23.0 | 23.0 | 23.0 | 23.0 | 23.0 | 23.0 |
| Zinc Oxide | 20.0 | 20.0 | 20.0 | 20.0 | 20.0 | 20.0 | 20.0 | 20.0 |
| Antioxidant | 0.2 | 0.2 | 0.2 | 0.2 | 0.2 | 0.2 | 0.2 | 0.2 |
| Processing Additive | — | 10.0 | — | 10.0 | — | 10.0 | — | — |
| Core Initiator | 0.5 | 0.5 | 0.5 | 0.5 | 0.5 | 0.5 | 0.5 | 0.5 |
| Total | 143.7 | 153.7 | 143.7 | 153.7 | 143.7 | 153.7 | 153.7 | 153.7 |

Rubber I included a high-cis polybutadiene that was obtained under the tradename BR11 (Japan Synthetic Rubber; Tokyo, Japan). Rubber II included a 70 Mooney ($ML_{1+4}$@100° C.) high-cis polybutadiene rubber (97%) that was prepared by employing a neodymium-based catalyst system that employed triisobutylaluminum and diethylaluminum chloride as cocatalysts. Rubber III included a 40 Mooney ($ML_{1+4}$@100° C.) high-cis polybutadiene rubber (97%) that was prepared by employing a neodymium-based catalyst system that employed triisobutylaluminum and diethylaluminum chloride as cocatalysts. Premix I included the same rubber as Rubber II, i.e., 70 Mooney high-cis polybutadiene rubber, together with a processing additive that was added to a rubber cement that included Rubber II. More specifically, Premix I was prepared by adding 10 parts by weight of a processing additive phr to a rubber cement that included about 16% rubber within a hexanes solvent. After conventional mixing of the processing additive within the rubber cement, the rubber was coagulated by steam desolventization. Premix II included Rubber III, i.e., 40 Mooney high-cis polybutadiene rubber, premixed with a processing additive in the same manner that Premix I was prepared. The processing additive that was employed in Premix I and Premix II included Aktiplastm™ GT (Rhein Chemie).

The zinc diacrylate was obtained under the tradename SR™ (Sartomer Co.; Exton, Pa.). The antioxidant was obtained under the tradename Irganox™ 1076 (Ciba-Geigy; Tarrytown, N.Y.) and the cure initiator was obtained under the tradename Vul-Cup™ 40R (Hercules).

The ingredients identified in Table I were mixed according to the following procedure. A 300 gram Brabender was preheated at 70° C., and the ingredients were mixed in a single pass and dropped at 100° C.

The uncured rubber composition was extruded and analyzed for various physical properties. The physical properties and results of these tests are set forth in Table II. Also, Table II includes data from analysis of a cured rubber component. Curing of the rubber components took place by heating the uncured extradate at 160° C. for 20 minutes.

TABLE II

| | 1 | 2 | 3 | 4 | 5 | 6 | 7 | 8 |
|---|---|---|---|---|---|---|---|---|
| Compound Analysis | | | | | | | | |
| Mooney Viscosity $ML_{1+4}$@100° C. | 34.9 | 20.0 | 53.9 | 21.4 | 31.7 | 16.8 | 26.8 | 9.7 |
| Garvey Die | 6.0 | 5.0 | 4.0 | 5.0 | 5.0 | 5.0 | 4.0 | 8.0 |
| Rheometer 160° C. 1° Arc 50° Range | | | | | | | | |
| Ts2 | 1.6 | 1.7 | 1.7 | 1.4 | 1.4 | 1.4 | 1.6 | 1.4 |
| Tc50 | 3.6 | 3.8 | 3.2 | 3.5 | 3.1 | 3.6 | 5.0 | 3.7 |
| Tc90 | 11.7 | 14.0 | 11.0 | 13.2 | 11.3 | 13.1 | 16.0 | 16.0 |
| ML | 5.5 | 3.5 | 7.6 | 4.6 | 4.9 | 3.5 | 5.7 | 3.3 |
| MH | 80.5 | 64.1 | 82.7 | 68.2 | 83.9 | 69.0 | 70.5 | 54.8 |
| Cured Sample Analysis | | | | | | | | |
| Zwick Rebound | | | | | | | | |
| 0° C. | 75.9 | 78.6 | 76.9 | 78.8 | 76.5 | 78.3 | 78.3 | 78.8 |
| 25° C. | 81.1 | 82.4 | 80.4 | 81.9 | 80.5 | 81.0 | 81.6 | 81.9 |
| 65° C. | 81.3 | 80.3 | 81.4 | 81.3 | 81.6 | 80.1 | 81.2 | 79.4 |
| Durometer @ Room Temperature | | | | | | | | |
| Shore A | 90 | 87 | 90 | 86 | 88 | 88 | 88 | 87 |
| Shore D | 38 | 33 | 39 | 32 | 39 | 34 | 34 | 32 |
| Viscoelastic Properties of Cured Sample Analysis @ −50° C. | | | | | | | | |
| G' (MPa) | 16.90 | 15.81 | 25.47 | 15.84 | 24.23 | 15.65 | 14.01 | 14.97 |
| G" (MPa) | 1.66 | 1.39 | 2.75 | 1.41 | 2.21 | 1.37 | 1.27 | 1.25 |
| Tan δ | 0.098 | 0.088 | 0.108 | 0.089 | 0.091 | 0.087 | 0.090 | 0.083 |

TABLE II-continued

|  | 1 | 2 | 3 | 4 | 5 | 6 | 7 | 8 |
|---|---|---|---|---|---|---|---|---|
| Analysis @ −20° C. | | | | | | | | |
| G' (MPa) | 13.76 | 12.52 | 20.14 | 13.56 | 20.19 | 12.96 | 11.80 | 12.17 |
| G" (MPa) | 0.54 | 0.42 | 0.83 | 0.35 | 0.67 | 0.47 | 0.33 | 0.34 |
| Tan δ | 0.040 | 0.034 | 0.041 | 0.026 | 0.033 | 0.032 | 0.028 | 0.028 |
| Analysis @ Minimum Tan δ | | | | | | | | |
| G' (MPa) | 13.55 | 11.81 | 19.50 | 13.55 | 19.80 | 12.76 | 11.74 | 11.64 |
| G" (MPa) | 0.22 | 0.20 | 0.31 | 0.22 | 0.33 | 0.19 | 0.22 | 0.22 |
| Tan δ | 0.016 | 0.017 | 0.016 | 0.016 | 0.017 | 0.015 | 0.019 | 0.019 |
| Temp (° C.) | 16 | 12 | 28 | 8 | 20 | 12 | 4 | 15 |

Figure 1:
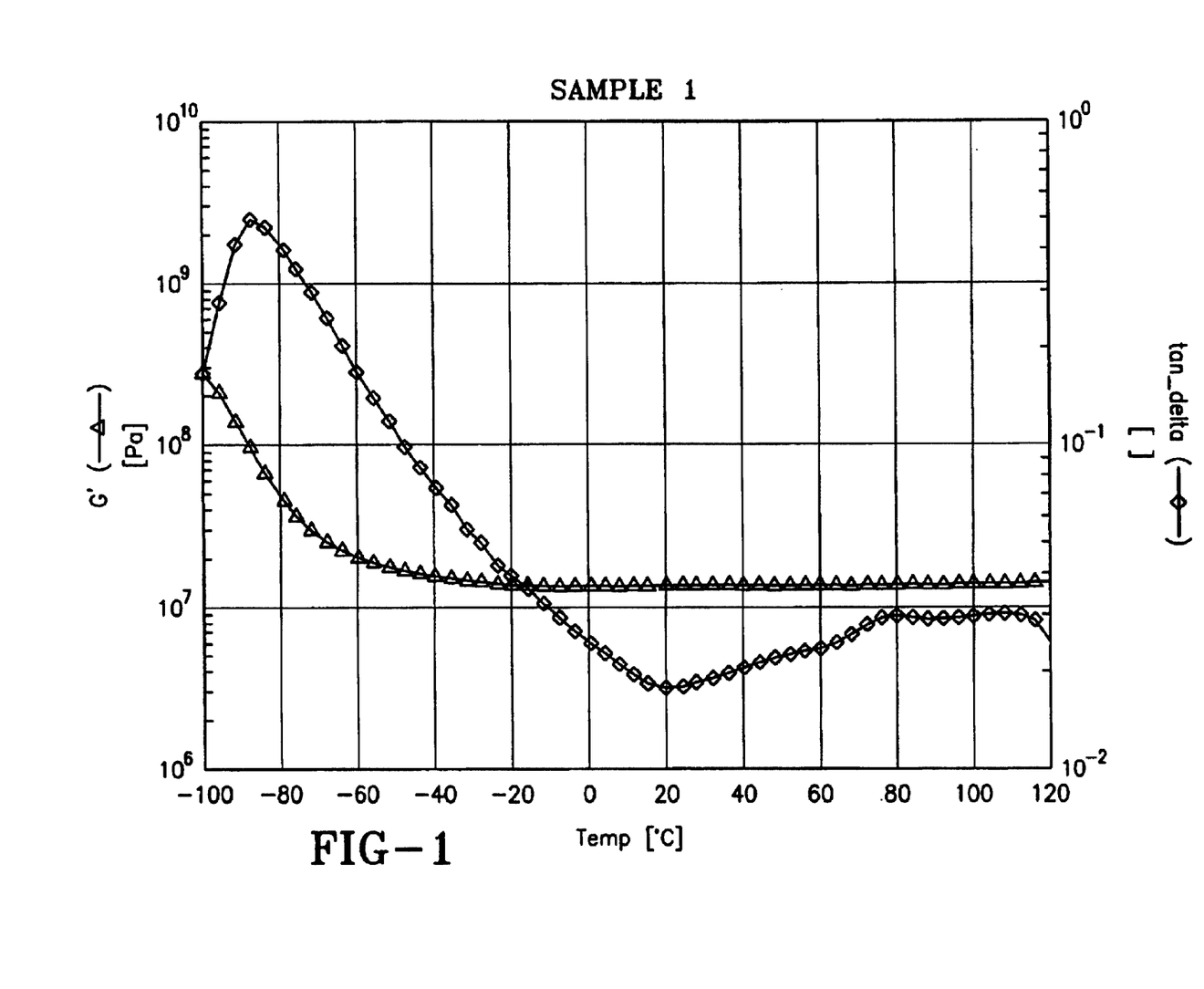
FIGS. 1–8 are viscoelastic temperature sweeps of rubber vulcanizates, where FIG. 1 (Sample 1), FIG. 3 (Sample 3), and FIG. 5 (Sample 5) are controls, FIG. 2 (Sample 2), FIG. 4 (Sample 4), and FIG. 6 (Sample 6) represent examples of this invention where a processing additive is added to the mixer, and FIG. 7 (Sample 7) and FIG. 8 (Sample 8) represent examples of this invention where a processing additive is added to the cement.
Figure 2:
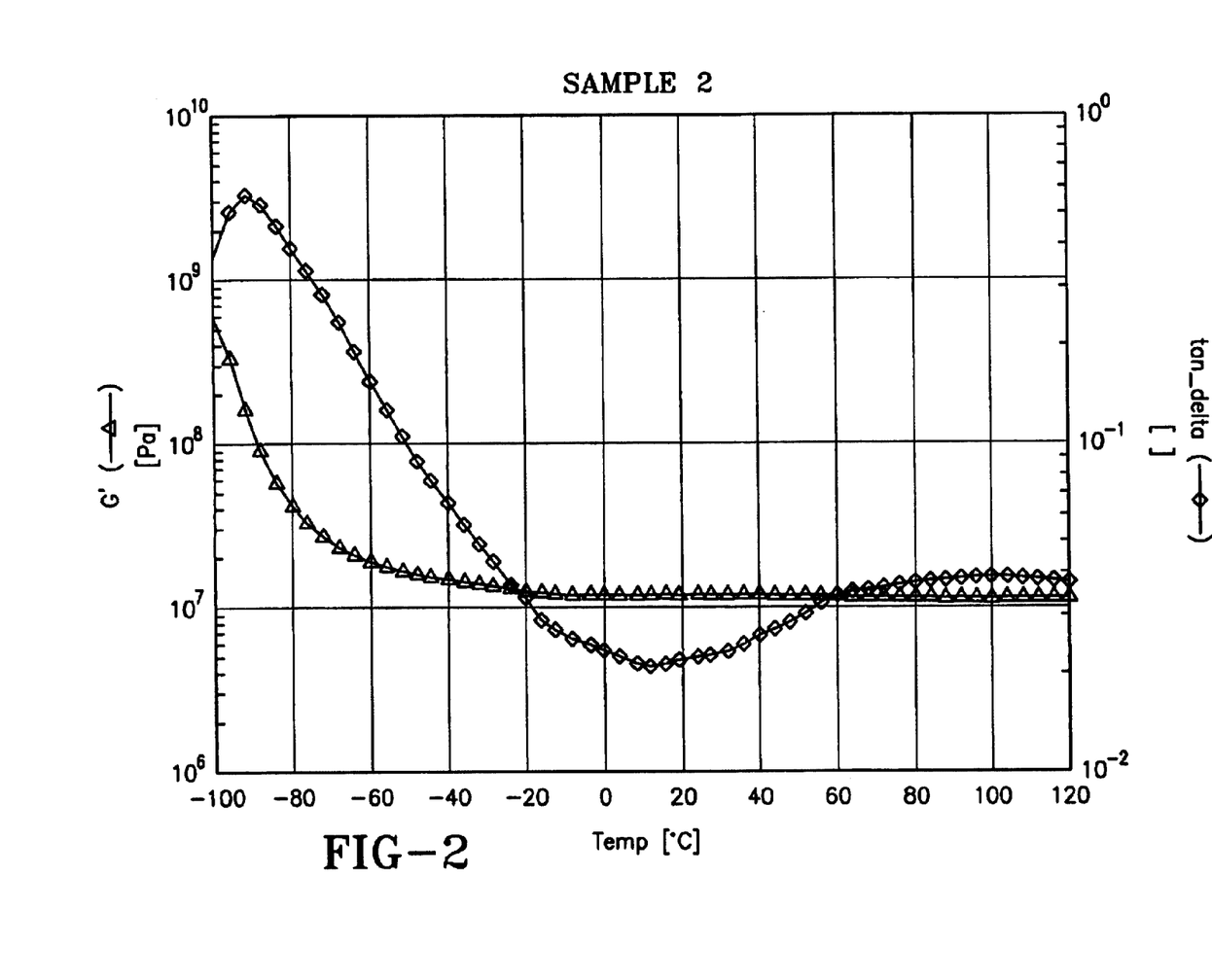
Figure 3:
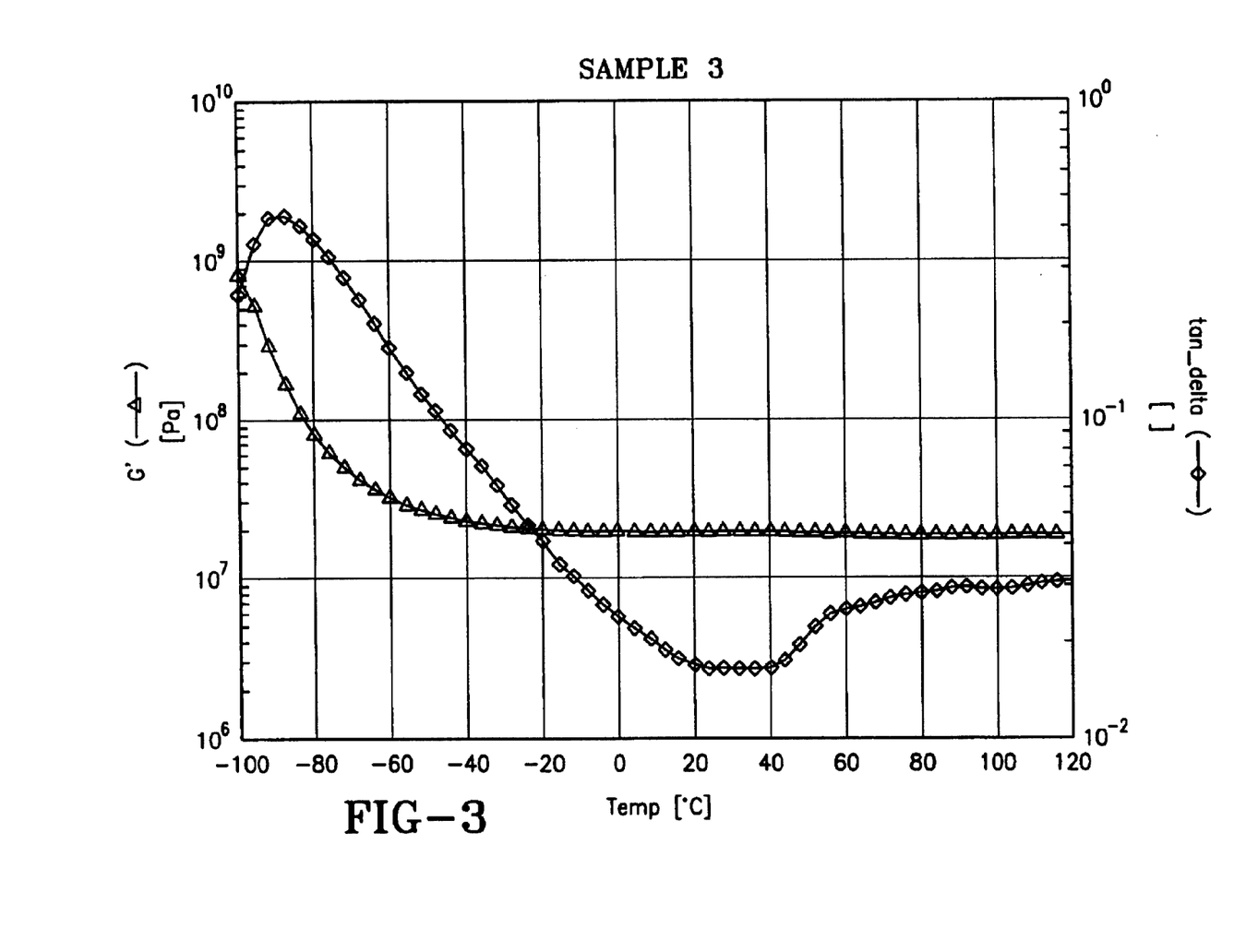
Figure 4:
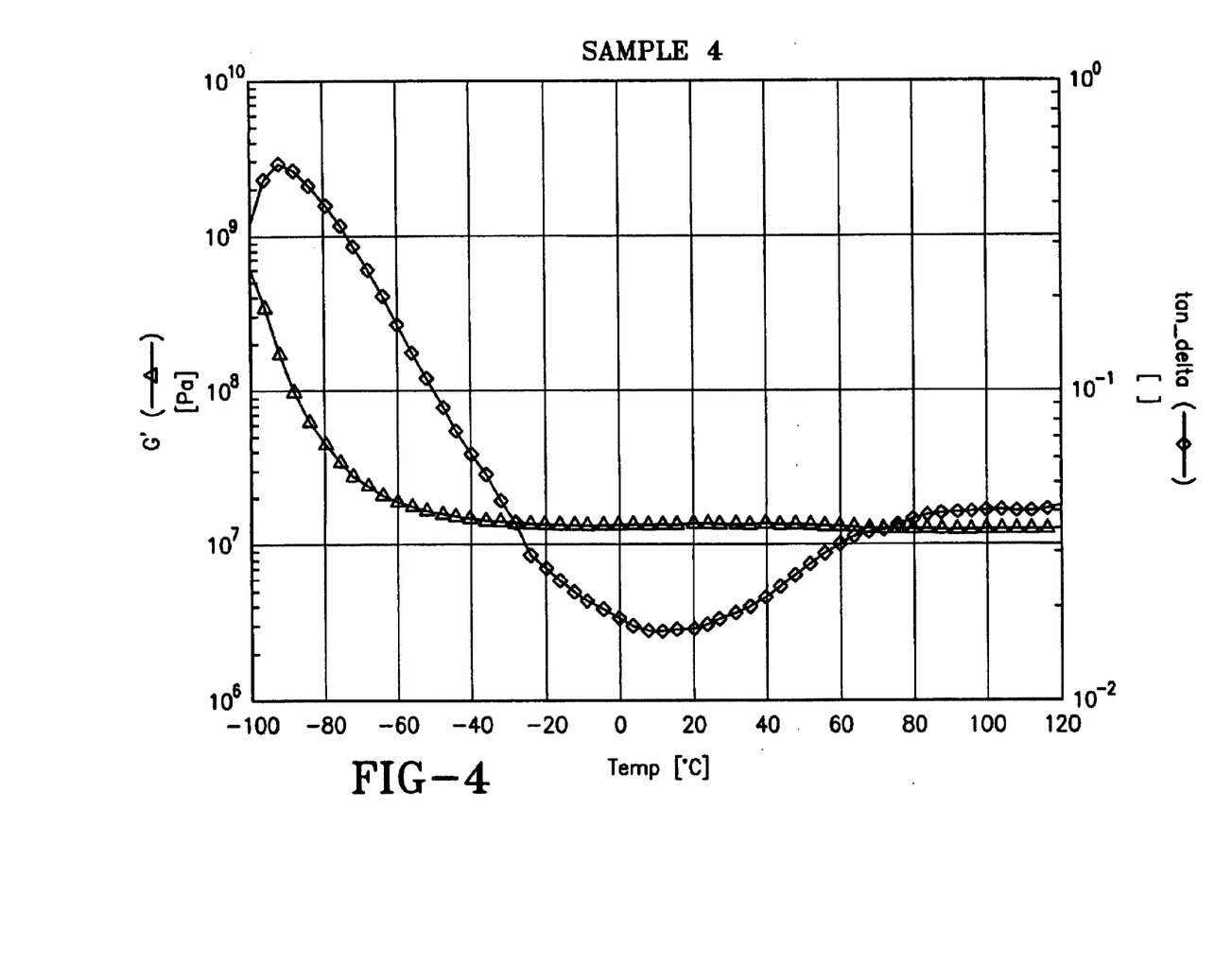
Figure 5:
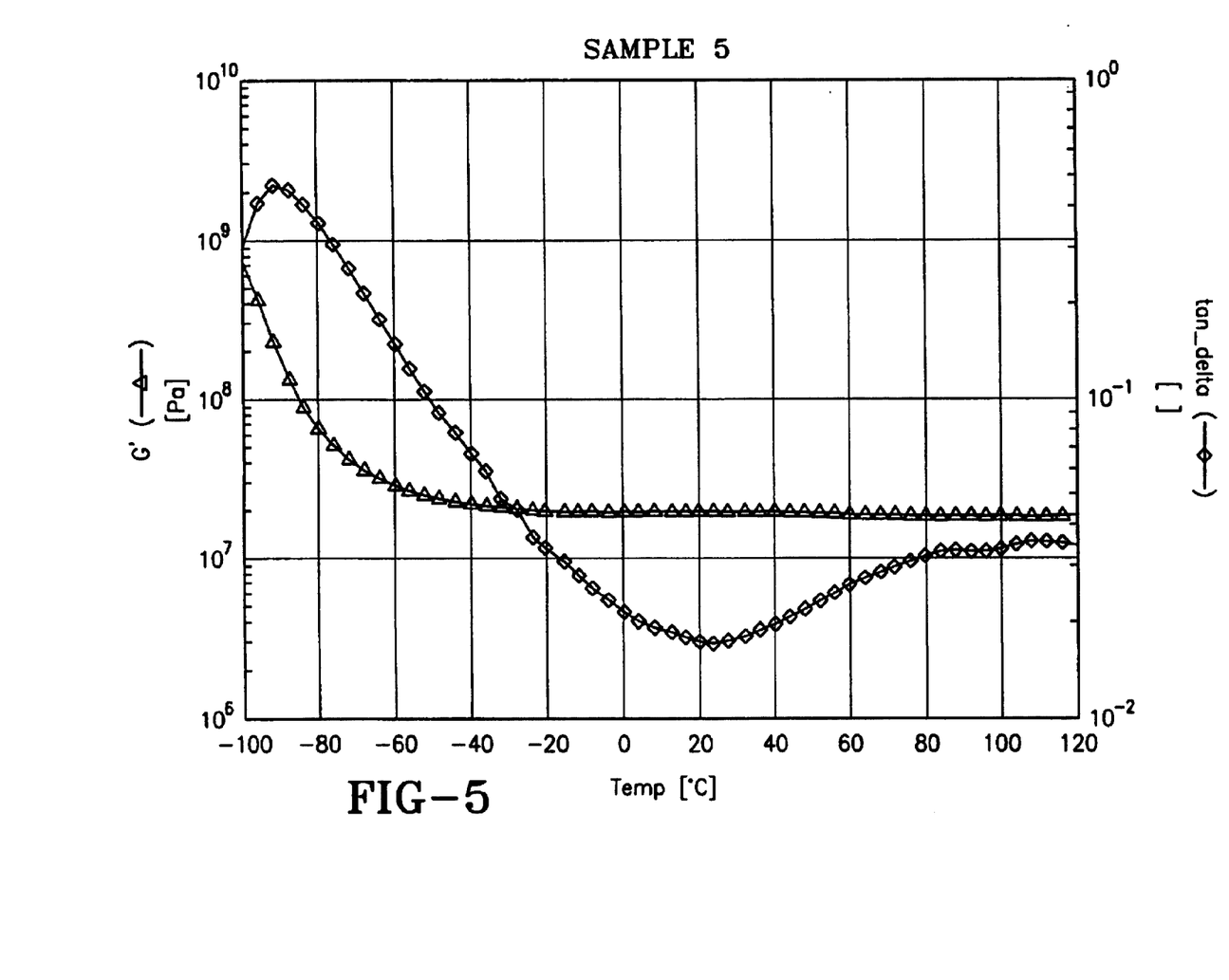
Figure 6:
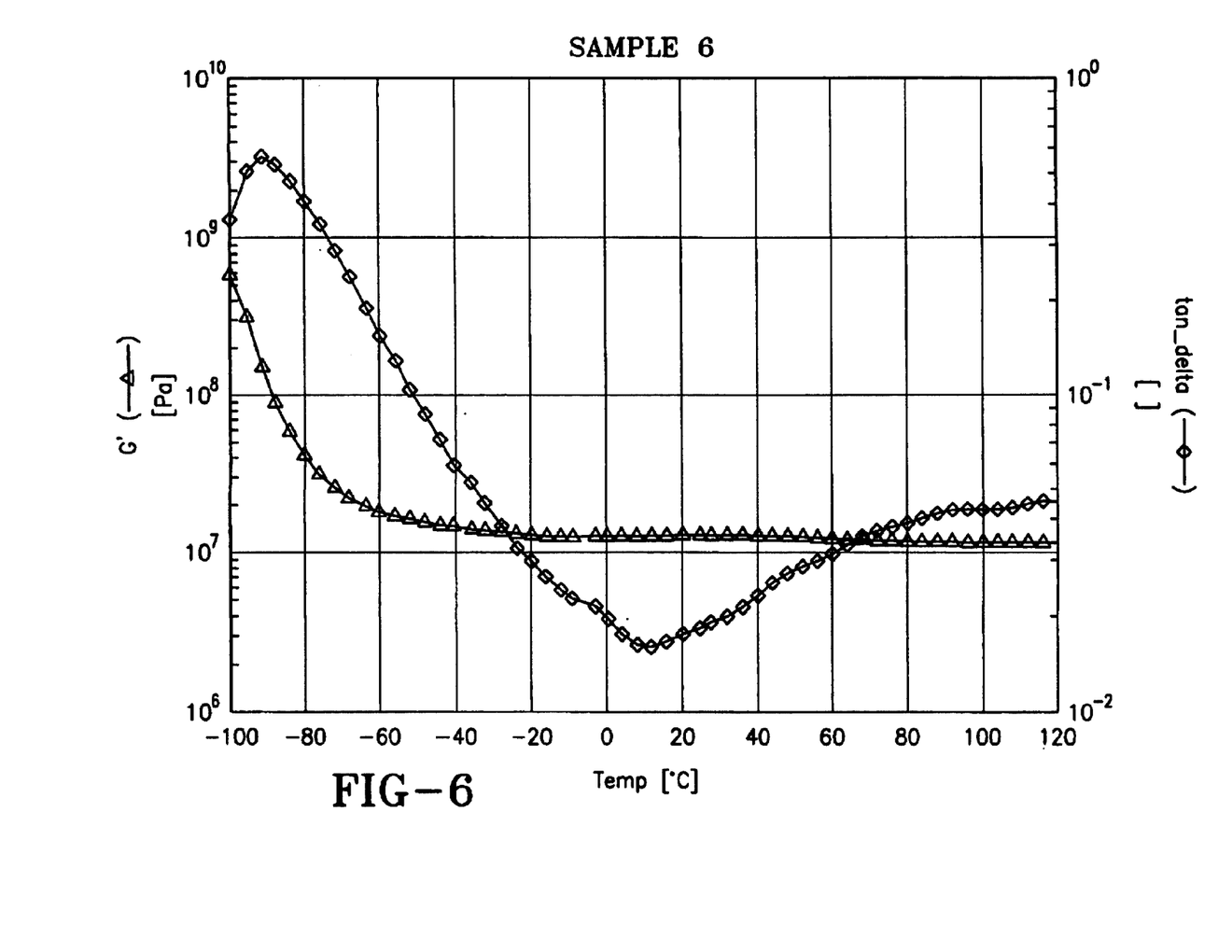
Figure 7:
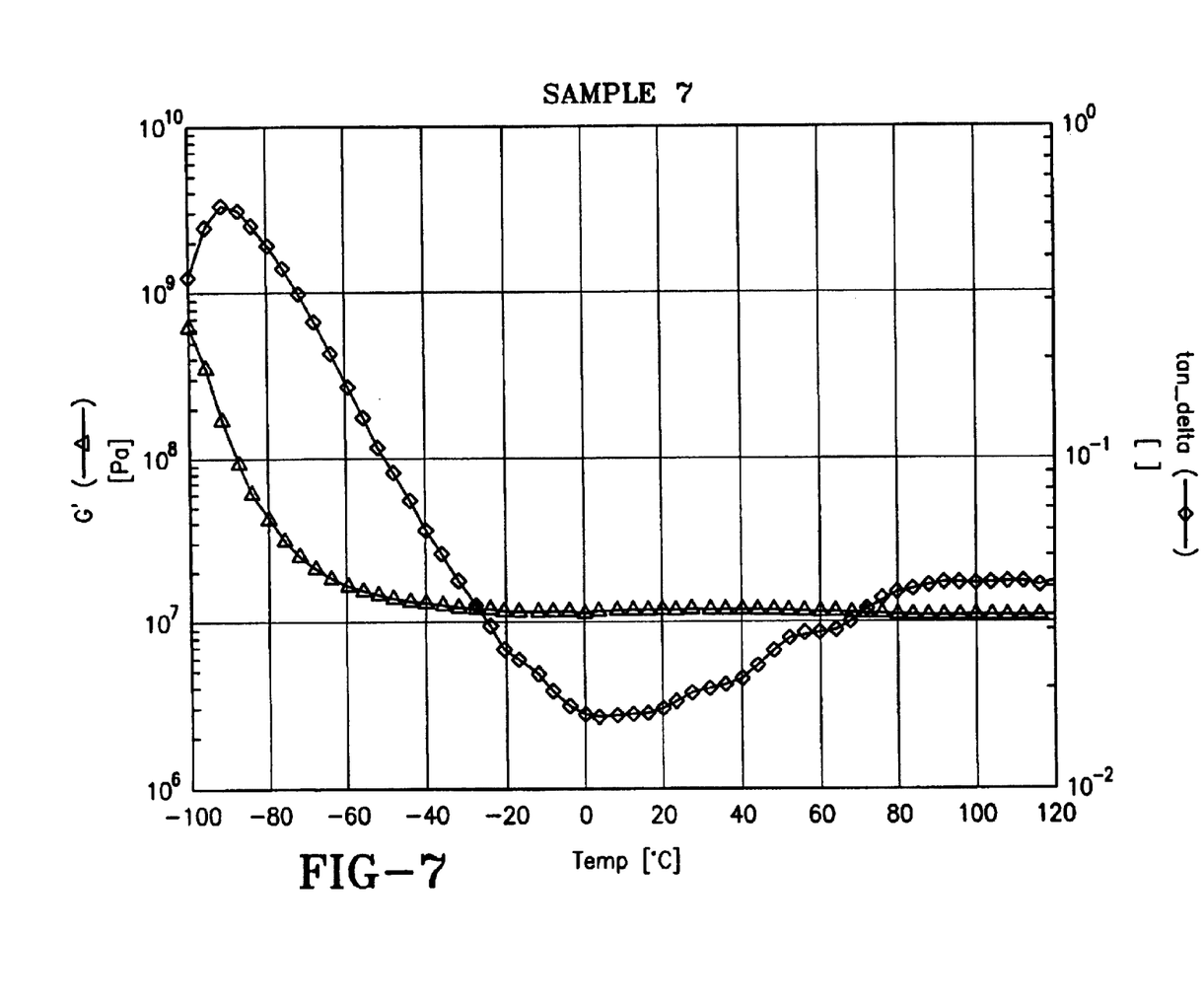
Figure 8:
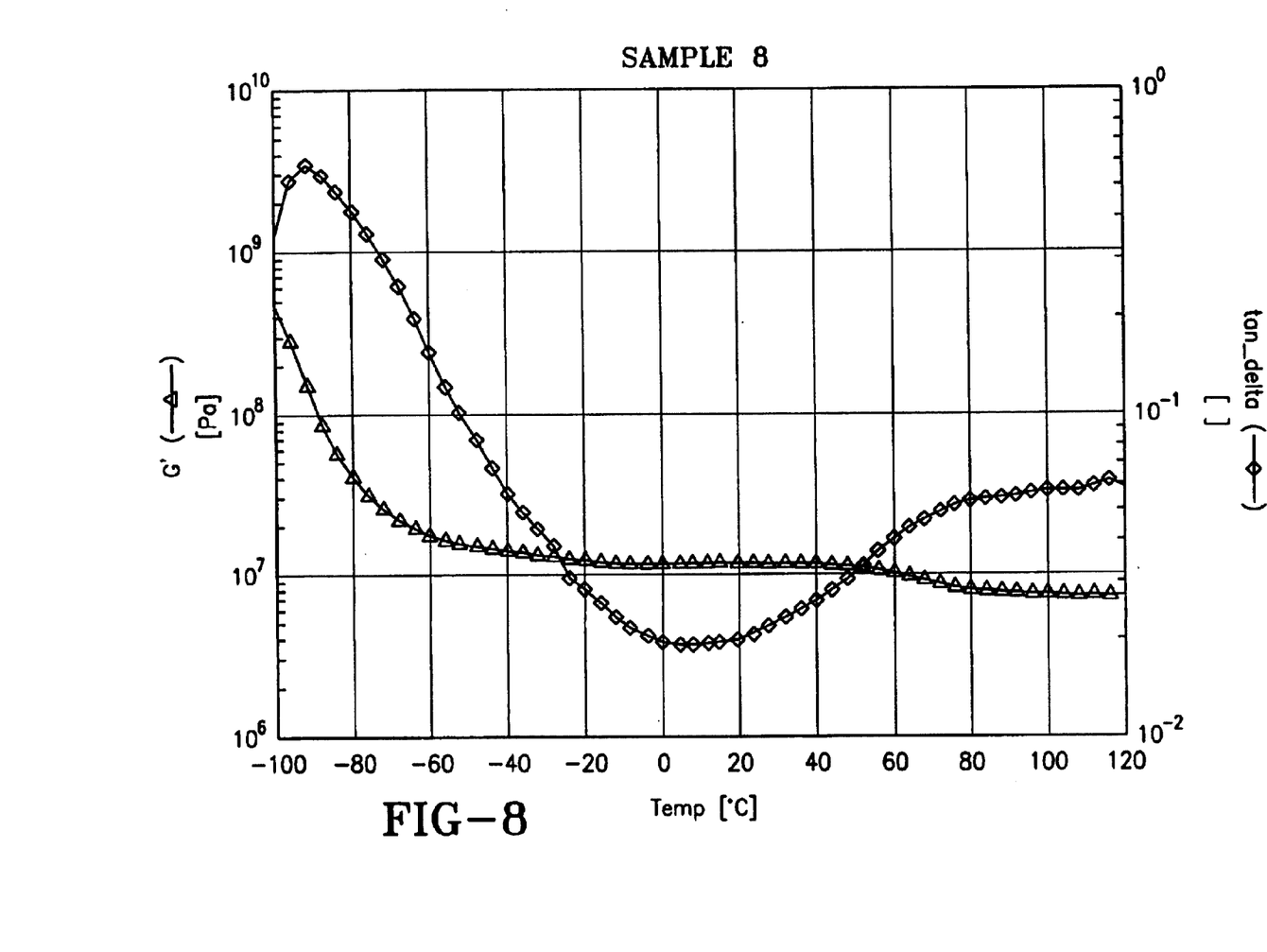

The viscoelastic properties of the samples were plotted as a function of temperature. These plots are shown in FIGS. 1–8. As can be seen from these plots, as well as the data included in Table II, the compositions that are representative of this invention (e.g., Samples 2, 4, 6, 7, and 8) show less hysteresis loss (Tan δ) at lower temperatures.

Standardized Temperature Sweep Analysis (RDA temperature ramp 120° C. to −120° C.@0.01% strain and 10 Hz) was employed to analyze the viscoelastic properties of the cured samples. Modulus at 300% and tensile strength were measured according to ASTM D 412 (1998) Method B, where samples were died from a cured sheet about 1.8 mm thick. Pendulum rebound was analyzed by employing a Zwick Rebound Resilience Tester (Zwick).

Samples 9–12

Four additional rubber compositions were prepared according to the recipe set forth in Table III.

TABLE III

| Sample | 9 | 10 | 11 | 12 |
|---|---|---|---|---|
| Rubber II | 100 | 100 | | |
| Premix III | | | 105 | |
| Premix IV | | | | 110 |
| Zinc Diacrylate | 23.0 | 23.0 | 23.0 | 23.0 |
| Zinc Oxide | 20.0 | 20.0 | 20.0 | 20.0 |
| Antioxidant | 0.2 | 0.2 | 0.2 | 0.2 |
| Processing Additive | — | 5.0 | — | — |
| Core Initiator | 0.5 | 0.5 | 0.5 | 0.5 |
| Total | 143.7 | 148.7 | 148.7 | 153.7 |

Rubber II, the zinc diacrylate, the antioxidant, and the cure initiator were similar to those employed in Samples 1–8. Likewise, the Aktiplast™ GT processing additive was employed in Sample 10. Premix III employed in Sample 11 included 100 parts by weight Rubber II, i.e., 70 Mooney high-cis polybutadiene rubber, together with 5 parts by weight sorbitan tri-oleate obtained under the name SPAN™ 85 (ICI Specialty Chemicals). Premix IV included 100 parts by weight Rubber II and 10 parts by weight of the sorbitan tri-oleate processing additive. Premix III and IV were prepared by adding the sorbitan tri-oleate processing additive to a rubber cement that included about 16% by weight rubber within a hexanes solvent. After conventional mixing of the processing additive within rubber cement, the rubber was coagulated by steam desolventization.

The ingredients identified in Table III were mixed according to the following procedure. A 300 gram Brabender was preheated at 70° C., and the ingredients were mixed in a single pass and dropped at 100° C.

The uncured rubber composition was extruded and analyzed for various physical properties. The physical properties and results of these tests are set forth in Table IV. Curing of the rubber components took place by heating the uncured extrudate at 160° C. for 20 minutes.

TABLE IV

|  | 9 | 10 | 11 | 12 |
|---|---|---|---|---|
| Compound Analysis | | | | |
| Mooney Viscosity ML$_{1+4}$@ 100° C. | 56.4 | 44.7 | 50.9 | 47.0 |
| Garvey Die | 4 | 4 | 4 | 4 |
| Rheometer 160° C. 1° Arc 50° Range | | | | |
| Ts2 | 1.6 | 1.5 | 1.6 | 1.7 |
| Tc50 | 3.2 | 3.5 | 3.9 | 4.6 |
| Tc90 | 10.6 | 11.8 | 9.6 | 11.9 |
| ML | 8.0 | 7.4 | 7.4 | 6.7 |
| MH | 87.1 | 80.8 | 76.0 | 67.4 |
| Cured Sample Analysis Zwick Rebound | | | | |
| 0° C. | 75.2 | 75.5 | 74.5 | 76.5 |
| 25° C. | 79.9 | 79.9 | 79.3 | 80.9 |
| 65° C. | 81.6 | 81.1 | 81.5 | 81.9 |
| Durometer @ Room Temperature | | | | |
| Shore A | 91 | 90 | 86 | 85 |
| Shore D | 40 | 40 | 38 | 30 |
| Viscoelastic Properties of Cured Sample Analysis @ −50° C. | | | | |
| G' (MPa) | 32.06 | 23.22 | 17.87 | 12.76 |
| G" (MPa) | 4.00 | 2.60 | 1.94 | 1.34 |
| Tan δ | 0.125 | 0.112 | 0.109 | 0.105 |
| Analysis @ Minimum Tan δ | | | | |
| G' (MPa) | 21.81 | 19.59 | 13.77 | 9.96 |
| G" (MPa) | 0.37 | 0.32 | 0.22 | 0.16 |
| Tan δ | 0.017 | 0.016 | 0.016 | 0.016 |
| Temp (° C.) | 40 | 24 | 32 | 16 |

As with Samples 1–8, the addition of a processing additive according to the present invention lowered the tan δ at −50° C. as can be seen when comparing Samples 9 and 10. Furthermore, the addition of the processing additive to the rubber cement further enhanced the tan δ reduction as can be seen by comparing Samples 9, 11, and 12.

Various modifications and alterations that do not depart from the scope and spirit of this invention will become apparent to those skilled in the art. This invention is not to be duly limited to the illustrative embodiments set forth herein.

What is claimed is:

1. A method for improving the feel and rebound velocity of a golf ball, the method comprising:
   preparing a golf ball from a rubber composition that comprises:
   a rubber,
   from about 3 to about 12 parts by weight of a processing additive per 100 parts by weight rubber, where said processing additive includes:
   i) a high-HLB surfactant having a hydrophilic-lipophilic balance of 3 to 35, where the high-HLB surfactant is (a) a fatty acid ester of $C_5$ or $C_6$ sugars or (b) polyoxyethylene derivatives of fatty acid esters of $C_5$ or $C_6$ sugars, or
   ii) at least two distinct zinc fatty acid salts, where the at least two distinct fatty acids salts include at least one saturated fatty acid salt and at least one unsaturated fatty acid salt,
   from about 18 to about 32 parts by weight of a multi-functional crosslinking agent per 100 parts by weight rubber,
   from about 0.2 to about 1.0 parts by weight of a cure initiator per 100 parts by weight rubber,
   from about 0 to about 25 parts by weight zinc oxide per 100 parts by weight rubber, and
   from about 0 to about 0.7 parts by weight antioxidant.

2. A golf ball made by the method claim 1.

3. The method of claim 1, where the processing additive is devoid of petroleum-derived oil.

4. The method of claim 1, where the processing additive is devoid of compounds having a flash-point that is less than 125° C.

5. The method of claim 1, where the high-HLB surfactant is a sorbitan oleate, sorbitan laurate, sorbitan palmate, sorbitan stearate, or mixture thereof.

6. The method of claim 1, where the high-HLB surfactant is sorbitan stearate, sorbitan oleate, sorbitan tri-oleate, POE (20) sorbitan monooleate, POE (20) sorbitan stearate, POE (20) sorbitan oleate, POE (20) sorbitan tri-oleate, POE (20) sorbitan sesquioleate, POE (20) sorbitan laurate, POE (20) sorbitan palmate, and mixtures thereof.

7. The method of claim 1, where the at least two distinct zinc fatty acid salts include a blend of palmitic, stearic, and oleic zinc salts.

8. A method for improving the feel and rebound velocity of a golf ball, the method comprising:
   preparing a golf ball from a rubber composition that includes a processing additive where said processing additive includes:
   i) a high-HLB surfactant having a hydrophilic-lipophilic balance of 3 to 35 where the high-HLB surfactant is (a) a fatty acid ester of $C_5$ or $C_6$ sugars, or (b) polyoxyethylene derivatives of fatty acid esters of $C_5$ or $C_6$ sugars, or
   ii) at least two distinct zinc fatty acid salts, where the at least two distinct fatty acids salts include at least one saturated fatty acid salt and at least one unsaturated fatty acid salt.

9. A method for preparing a golf ball, the method comprising:
   providing a rubber cement that includes rubber and solvent where the rubber is polybutadiene having a cis content of at least 60%;
   adding a processing additive to the rubber cement to form a modified rubber cement, where said processing additive includes:
   i) a high-HLB surfactant having a hydrophilic-lipophilic balance of 3 to 35, or
   ii) at least two distinct zinc fatty acid salts;
   isolating the processing additive and rubber from the rubber cement to form a premix;
   adding a multi-functional crosslinking agent and cure initiator to the premix to form a rubber composition, where the multifunctional crosslinking agent is zinc diacrylate, zinc dimethylacrylate, or both;
   mixing the rubber composition to form a curable rubber composition;
   extruding the curable rubber composition into a pre-cured golf ball component;
   employing the golf ball component to construct a pre-cured golf ball; and
   curing the pre-cured golf ball.

10. The method of claim 9, where said step of adding a processing additive to the rubber cement includes first preparing a cocktail that includes a blend of an organic solvent and a processing additive and adding this cocktail to the cement.

11. The method of claim 10, where the high-HLB surfactant has a hydrophilic-lipophilic balance of 10 to 33.

* * * * *